March 19, 1935.  R. K. HOPKINS  1,994,650
ELECTRIC ARC WELDING ELECTRODE
Filed March 10, 1933
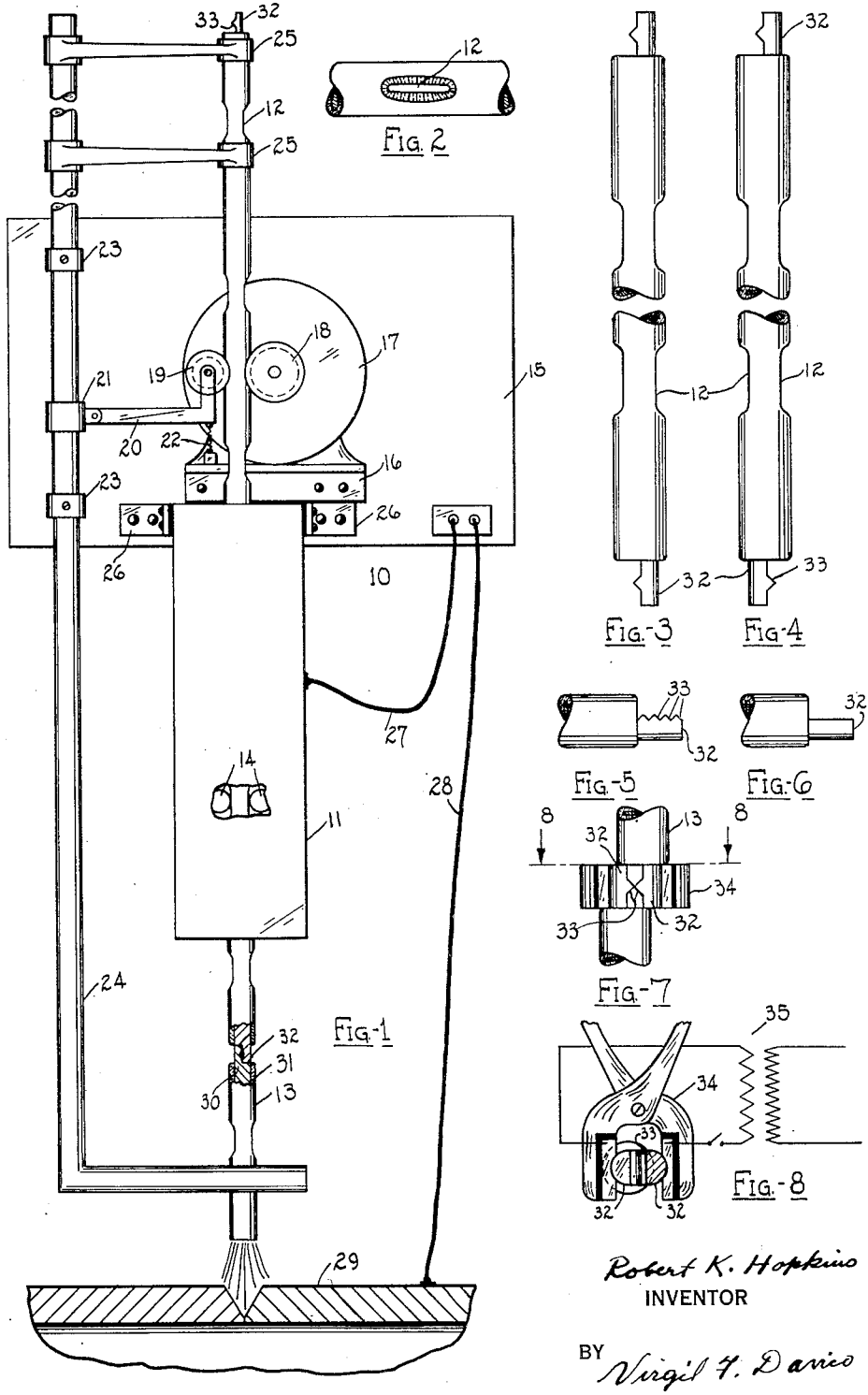
Robert K. Hopkins
INVENTOR
BY Virgil F. Davies
ATTORNEY Patented Mar. 19, 1935

1,994,650

UNITED STATES PATENT OFFICE 1,994,650

ELECTRIC ARC WELDING ELECTRODE

Robert K. Hopkins, New York, N. Y., assignor to The M. W. Kellogg Co., New York, N. Y., a corporation of Delaware Application March 10, 1933, Serial No. 660,221

11 Claims. (Cl. 219—8)

This invention relates to electric arc welding, and in particular to a covered welding electrode of the rod type.

In my copending application Serial No. 610,553 filed May 11, 1932, I have disclosed a method and apparatus for carrying on electric arc welding with a non-conducting material covered welding electrode as a continuous operation. Briefly the electrode described in said copending application comprises an indefinite number of easily connectible sections having the non-conducting covering scored at spaced intervals to expose areas of the metallic core through which the welding current may be passed. Although the electrode described in my said copending application is entirely satisfactory if assembled and used as described, yet there is always the possibility of trouble arising due to the operator's carelessness or ignorance.

For instance, if care is not taken to properly join the sections so that joints of comparatively low resistance are obtained, when the welding current passes through the joint, portions of the welding electrode adjacent the joint will become excessively heated with the result that the non-conducting coating may disintegrate and expose the metallic core before it reaches the arc. Also, when the electrode is used with welding current supply apparatus which automatically contacts with the exposed areas on their way to the arc, care must be taken to properly align the exposed areas of the sections as the sections are joined so that the exposed areas will pass through predetermined paths on their way to the arc, otherwise the welding current will not be passed to the exposed areas and the welding interrupted.

It is an object of this invention to provide a welding electrode of the character mentioned, the sections of which include joinable ends which are so arranged relative to the exposed areas that when the ends of the sections are matched during the joining operation the exposed areas of the sections are automatically aligned.

It is a further object of this invention to provide a welding electrode of the character mentioned, the sections of which include ends so formed that they may be quickly joined by electrical flash or resistance welding to provide a continuous current path of substantially constant resistance.

Other objects and advantages of the invention will be apparent from a consideration of the description which follows, taken with the accompanying drawing, in which, Fig. 1 is a front elevation of an electric arc welding machine employing the welding electrode of this invention, Fig. 2 is a fragmentary view showing one of the exposed areas of the electrode, Figs. 3 and 4 are fragmentary views of sections of welding electrode showing the ends differently arranged, Figs. 5 and 6 are fragmentary views showing different types of ends, Fig. 7 is an elevation showing a pair of ends about to be joined, and, Fig. 8 is a section taken on line 8—8 of Fig. 7.

Electric arc welding machine 10 may be of any suitable construction but I have preferred to show it as including an automatic device 11 for passing the welding current to the exposed areas 12 of the welding electrode 13, so as to better bring out the features of the invention. Device 11 is similar to the contact device, described in detail in my copending application Serial No. 660,220, filed March 10, 1933, since matured into Patent No. 1,954,999 of April 17, 1934, and includes a plurality of pairs of rollers 14 for contacting with the exposed areas 12 as areas 12 pass through device 11. Electric arc welding machine 10 includes welding current supply means, welding electrode feed motor control means and electrode oscillating means, all of these means, being of character well known in the art, have not been shown and will be considered as located in back of panel 15 with the electrode oscillating means mounted to oscillate panel 15.

To panel 15 is fastened a bracket 16 which has mounted thereon electrode feeding motor 17. Electrode feeding wheel 18, which is preferably provided with a rubber, or similar material, contact portion is mounted on the shaft of motor 17. A contact wheel 19 similar to feeding wheel 18 is mounted in a yoke 20 pivoted to member 21. A spring 22 having one end fastened to yoke 20 and the other end to a small bracket extending from bracket 16 constantly urges wheel 19 into control with electrode 13. Wheel 19 serves to prevent slip in the drive of electrode 13.

Brackets 23 are also fastened to panel 15 and support guide member 24 upon which is mounted member 21. The upper portion of guide member 24 carries guides 25 which serve to guide electrode 13 to feeding wheel 18. The lower end of guide member 24 is bent and perforated to allow the passage of welding electrode 13 therethrough so as to guide welding electrode 13 as it approaches the arc.

Panel 15 has also fastened thereto support members 26 which support between them contact device 11, suitable insulation being provided between device 11 and support members 26 to electrically insulate device 11 from the rest of machine 10. Device 11 is connected through a cable 27 to one side of the welding current source, the other side being connected through cable 28 to the work 29.

Welding electrode 13 as shown is made up of a plurality of connected sections. Each section comprising a metallic core 30 and a covering 31 made of ceramic or similar non-conducting material. Non-conducting covering 31 terminates adjacent the ends of core 30 to expose ends 32 of core 30. Ends 32, as shown, are semi-cylindrical in shape, the edges of the cylindrical surface being connected by a flat surface which as shown in Figs. 1, 3, 4 and 5 may have one or more V-shaped projections 33 extending therefrom. Portions of non-conducting covering 31 are removed at spaced intervals to expose a plurality of spaced pairs of areas 12 of core 30.

While I find that spaced pairs of exposed areas 12 are preferable, electrode 13 can be made to serve its purpose by exposing spaced areas on one side only of the section or by alternately exposing an area on one side of the section and then one on the other side.

As shown in Fig. 4, one end 32 of each section may be disposed on one side of a plane which includes the axis of the section and the other end disposed on the other side of the plane, or as shown in Fig. 3, both ends 32 may be disposed on the same side of the plane mentioned. However, if the spaced exposed areas 12 are all on one side of the section then ends 32 should be disposed as in Fig. 4. As shown in Fig. 6 ends 32 may be made with the surface which connects the edges of the cylindrical surface devoid of projections 33. This form of end 32 though usable, is not as practical as the forms shown in Figs. 1, 3, 4 and 5.

In carrying on the welding operation, after machine 10 has been properly related to work 29 and the various motor circuits closed the first section of electrode 13 is passed through guides 25 to feeding wheel 18. The section is then rotated to align exposed areas 12 with rollers 14 so that the rollers 14 can contact with exposed areas 12 and pass the welding current to core 30 as the section passes through device 11 on its way to work 29.

As the first section is consumed and the other end 32 thereof approaches feeding wheel 18, one end 32 of a second section is passed through guides 25 and lowered to meet the first section. The second section is then rotated to match its end 32 with end 32 of the first section, as shown in Figs. 7 and 8. The matching of ends 32 automatically aligns exposed areas 12 of the second section with exposed areas 12 of the first section and with rollers 14. Matched ends 32 are then grasped in the jaws of an electrical flash or resistance welding tool 34 and after its electrical circuit, diagrammatically shown in Fig. 8 and numbered 35, is closed pressure is applied to bring the longitudinal faces of ends 32 together. The passage of the current through ends 32, projections 33 being in contact, causes projections 33 to melt and weld the faces of ends 32. Ends 32 are not merely held together by a mechanical bond, but the union is such that a continuous molecular path is offered to the passage of the welding current from one section of electrode 13 to another section. For this reason there is no tendency for electrode 13 to unduly heat at the joints when the welding current passes through the joints. Not only is the electrical connection between sections of the electrode vastly improved but also the mechanical strength of the joint is much greater than that of the joints previously used.

If ends 32 of the sections of electrode 13 are formed as shown in Fig. 6 the welding together of ends 32 is carried on as above. However, due to the much greater contact areas the welding will take longer and the joints may not be as perfect as when ends 32 include projections 33.

Though I have shown ends 32 as being semi-cylindrical it should be obvious that the invention is not limited to ends of any particular shape so long as the ends include the necessary elements for forming the electrical flash or resistance welded joint and securing the automatic alignment of exposed areas 12 of the sections. Also, though I have shown ends 32 as formed by cutting away portions of core 30 to form a welding face in a plane parallel to the axis of electrode 13, it should be obvious that the automatic alignment feature of the invention may also be obtained by so forming ends 32 that their welding faces are in planes angularly disposed to the axis of electrode 13.

I claim:

1. An electric arc welding electrode made up of a plurality of end to end connected like sections, each of said sections comprising a metallic core and a non-conducting covering for said core; portions of said non-conducting covering being removed at spaced intervals along the length of the section to expose pairs of aligned small areas of said core; the ends of each of said sections being connected to the ends of the adjacent sections by means of welded joints angularly disposed to a plane transverse to the longitudinal axis of the welding electrode, the corresponding areas of the pairs of areas of all of the sections being in alignment.

2. An electric arc welding electrode made up of a plurality of end to end connected like sections, each of said sections comprising a metallic core and a non-conducting covering for said core; portions of said non-conducting covering being removed at spaced intervals along the length of the section to expose pairs of aligned small areas of said core; said non-conducting covering terminating short of each end of the section, the ends of each section being connected to the ends of the adjacent sections by means of electric flash resistance welds angularly disposed to a plane transverse to the longitudinal axis of the welding electrode; the corresponding areas of the pairs of areas of all of the sections being in alignment.

3. In electric arc welding, a section of electric welding electrode which is adapted to be joined to similar sections to form a continuous electrode of indefinite length, said section including a metallic core, portions of each end of said core being cut away to provide counter parts of electric flash resistance welded joints, said counter parts each having a welding face angularly disposed to a plane transverse to the longitudinal axis of the section.

4. In electric arc welding, a section of electric welding electrode which is adapted to be joined to similar sections by electrical flash or resistance welding to form a continuous electrode of indefinite length, said section including a metallic core, portions of each end of said core being cut away to provide counter parts of electric flash resistance welded joints, said counter parts each having a welding face angularly disposed to a plane transverse to the longitudinal axis of the section, there being projections on said faces which are adapted to form the initial contact areas during the electrical flash or resistance welding and supply weld metal.

5. In electric arc welding, a section of electric welding electrode which is adapted to be joined to similar sections by electric flash resistance welding to form a continuous electrode of indefinite length, said section comprising a metallic core and a nonconducting covering therefore, said covering terminating adjacent the ends of said core to expose the ends of said core, portions of said non-conducting covering being removed at spaced intervals along the length of the section to expose aligned pairs of small areas of said core, said exposed ends of said core being cut away to provide counter parts of electric flash or resistance welded joints having welding faces angularly disposed to a plane transverse to the longitudinal axis of the section, the plane of each of said welding faces being so related relative to said transverse plane that when either of said faces is matched with the corresponding or opposite face of a like section the exposed areas of both sections are aligned.

6. In electric arc welding, a section of electric welding electrode which is adapted to be joined to similar sections by electric flash or resistance welding to form a continuous electrode of indefinite length, said section comprising a metallic core and a non-conducting covering therefore, said covering terminating adjacent the ends of said core to expose the ends of said core, portions of said non-conducting covering being removed at spaced intervals along the length of the section to expose aligned pairs of small areas of said core, said exposed ends of said core being cut away to provide counter parts of electric flash or resistance welded joints having welding faces angularly disposed to a plane transverse to the longitudinal axis of the section, said faces having projections extending therefrom which are adapted to form initial contact areas and supply weld metal during the electrical flash or resistance welding, the plane of each of said faces being so related relative to said transverse plane that when either of said faces is matched with the corresponding or opposite face of a like section the exposed areas of both sections are aligned.

7. In electric arc welding, a section of electric welding electrode which is adapted to be joined to similar sections by electric flash or resistance welding to form a continuous electrode of indefinite length, said section comprising a metallic core and a non-conducting covering therefore, said covering terminating adjacent the ends of said core to expose the ends of said core, portions of said non-conducting covering being removed at spaced intervals along the length of the section to expose aligned small areas of said core, substantially one half of each of said exposed ends of said core being cut away to provide welding faces, each of said faces being disposed in a longitudinal plane which passes through the axis of the section.

8. In electric arc welding, a section of electric welding electrode which is adapted to be joined to similar sections by electric flash or resistance welding to form a continuous electrode of indefinite length, said section comprising a metallic core and a non-conducting covering therefore, said covering terminating adjacent the ends of said core to expose the ends of said core, portions of said non-conducting covering being removed at spaced intervals along the length of the section to expose aligned small areas of said core, substantially one half of each of said exposed ends of said core being cut away to provide welding faces having projections extending therefrom which are adapted to form initial contact areas and supply weld metal during the electrical or flash resistance welding, said faces being disposed in a longitudinal plane which includes the longitudinal axis of the section.

9. In electric arc welding, a section of electric welding electrode which is adapted to be joined to similar sections by electric flash or resistance welding to form a continuous electrode of indefinite length, said section comprising a metallic core and a non-conducting covering therefor, said covering terminating adjacent the ends of said core to expose the ends of said core, portions of said non-conducting covering being removed at spaced intervals along the length of the section to expose aligned small areas of said core, portions of each of said exposed ends being cut away to form semi-cylindrical joint forming means having a welding face in a longitudinal plane which passes through the longitudinal axis of the section.

10. In electric arc welding, a section of electric welding electrode which is adapted to be joined to similar sections by electric flash or resistance welding to form a continuous electrode of indefinite length, said section comprising a metallic core and a non-conducting covering therefore, said covering terminating adjacent the ends of said core to expose the ends of said core, portions of said non-conducting covering being removed at spaced intervals along the length of the section to expose aligned pairs of small areas of said core, said exposed ends being cut away to form semi-cylindrical joint forming means, each having a welding face in a longitudinal plane which passes through the longitudinal axis of the section, one of said joint forming means being disposed on one side of said longitudinal plane and the other of said joint forming means being disposed on the other side of said longitudinal plane.

11. In electric arc welding, a section of electric welding electrode which is adapted to be joined to similar sections by electric flash or resistance welding to form a continuous electrode of indefinite length, said section comprising a metallic core and a non-conducting covering therefor, said covering terminating adjacent the ends of said core to expose the ends of said core, portions of said non-conducting covering being removed at spaced intervals along the length of the section to expose aligned pairs of small areas of said core, said exposed ends being cut away to form semi-cylindrical joint forming means, each having a welding face in a longitudinal plane which passes through the longitudinal axis of the section, projections on said welding faces adapted to serve as initial contact areas and supply weld metal for the weld, one of said joint forming means being disposed on one side of said longitudinal plane and the other of said joint forming means being disposed on the other side of said longitudinal plane.

ROBERT K. HOPKINS.